June 20, 1944.  L. C. SWIM ET AL  2,351,846
ELEVATING BED VEHICLE
Filed May 22, 1943  2 Sheets-Sheet 1
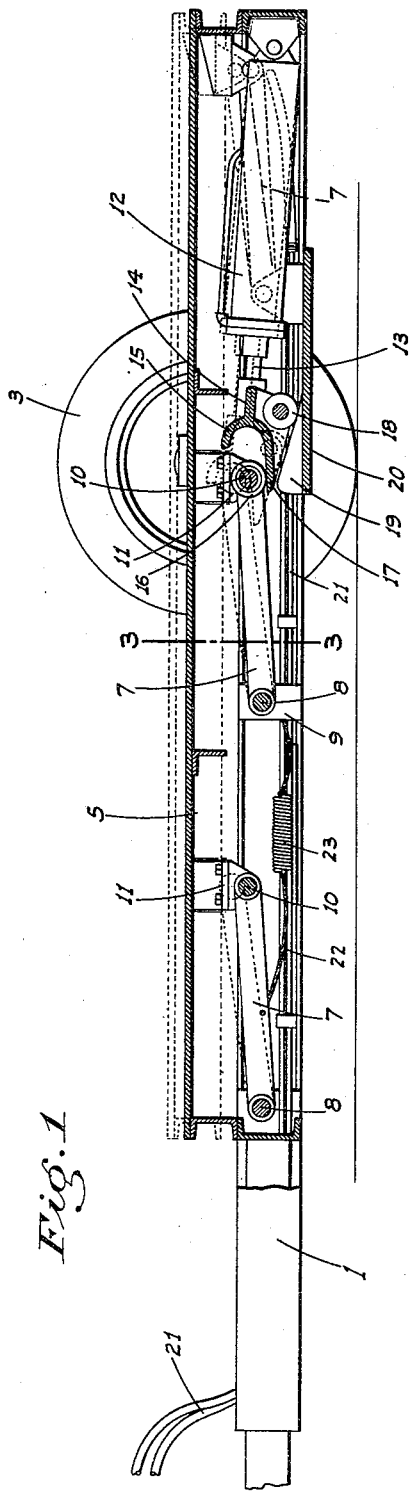
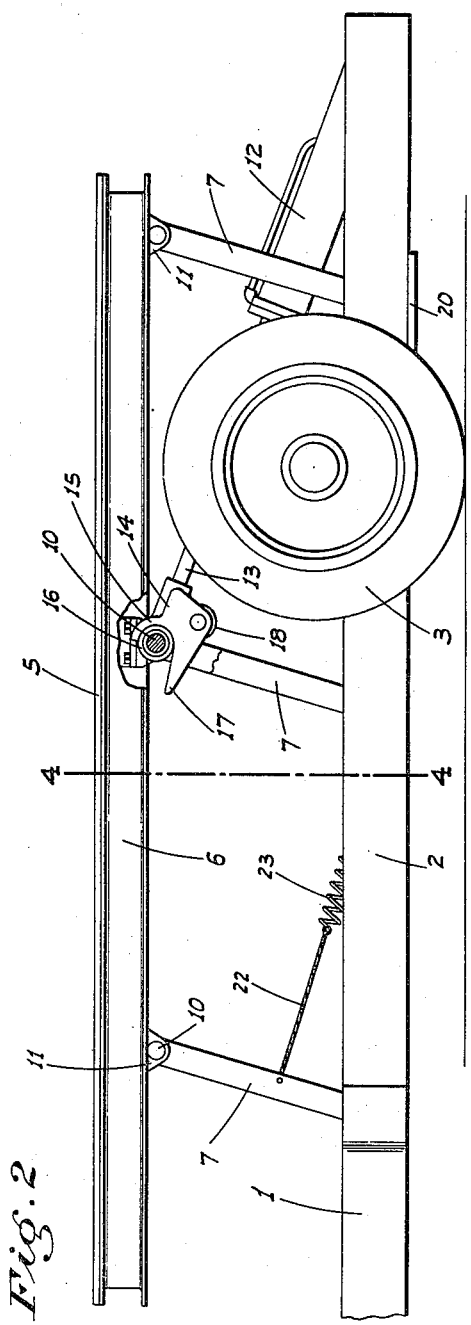
INVENTORS
Lowell C. Swim
Claud H. Williams
BY
Corbitt & Herbit
ATTYS June 20, 1944.   L. C. SWIM ET AL   2,351,846
ELEVATING BED VEHICLE
Filed May 22, 1943   2 Sheets-Sheet 2
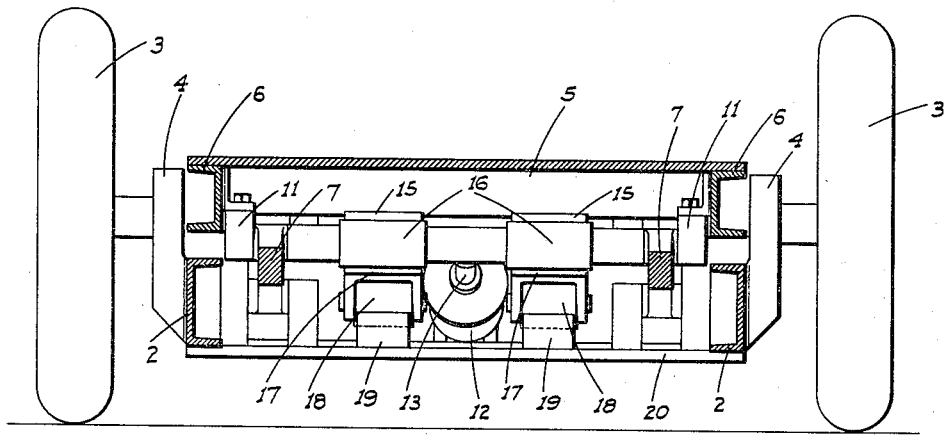
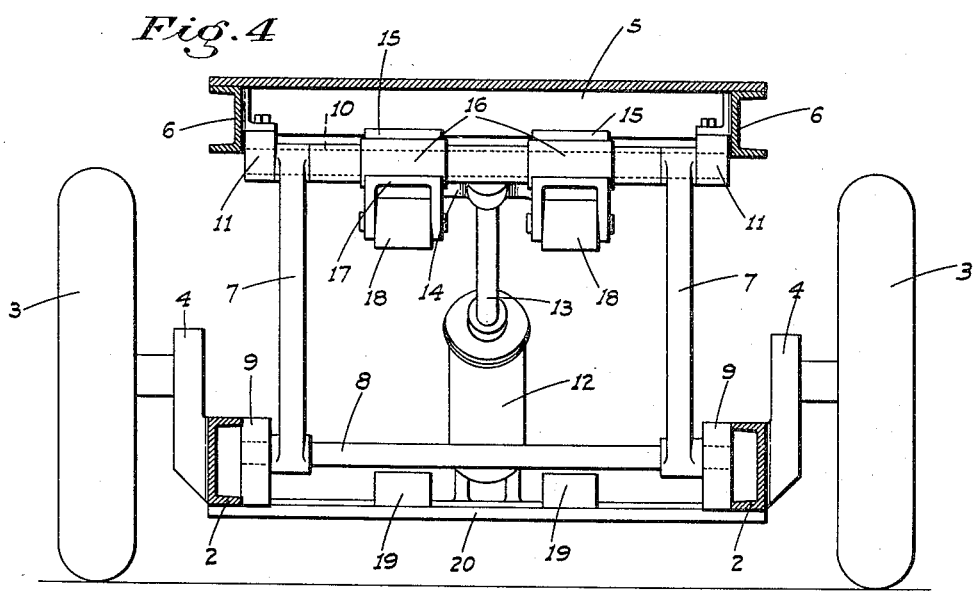
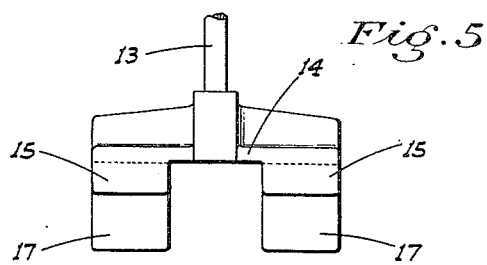
INVENTORS
Lowell C. Swim
Claud H. Williams
BY
Webster & Webster
ATTYS Patented June 20, 1944

2,351,846

UNITED STATES PATENT OFFICE 2,351,846

ELEVATING BED VEHICLE

Lowell C. Swim and Claud H. Williams,
Modesto, Calif.

Application May 22, 1943, Serial No. 488,050

6 Claims. (Cl. 254—2)

This invention relates to commercial load carrying vehicles and particularly represents improvements, with respect to the operating mechanism, of the structure shown in the co-pending application for patent of L. C. Swim, Serial No. 421,267, filed December 2, 1941, now Patent No. 2,297,992 dated October 6, 1942.

The principal object of the present invention is to provide, in a vehicle having a vertically movable load carrying bed, and swinging linkage supporting the bed from a fixed-level framework or supporting structure, a mechanism to swing the linkage up and thus raise the bed, so arranged that said linkage may be practically horizontal when the bed is fully lowered, without the need of excessive power being necessary to start the linkage from such practically dead-center position. In this manner the maximum lift of the bed from a lowered position may be obtained, while at the same time the desired low level of the bed, combined with good ground clearance when the bed is fully lowered, is assured.

A further object of the invention is to provide a simple and inexpensive device, and yet one which will be exceedingly effective for the purpose for which it is designed.

These objects we accomplish by means of such structure and relative arrangement of parts as will fully appear by a perusal of the following specification and claims.

In the drawings similar characters of reference indicate corresponding parts in the several views:

Figure 1 is a sectional elevation of my improved vehicle showing the bed fully lowered.

Figure 2 is a side elevation of the vehicle partly in section, showing the bed raised.

Figure 3 is a transverse section on the line 3—3 of Fig. 1 showing the bed as initially raised by the cam action of the operating mechanism.

Figure 4 is a cross section on the line 4—4 of Figure 2 showing the bed as fully raised.

Figure 5 is a plan view of the link-roller engaging cross head detached.

Referring now more particularly to the characters of reference on the drawings, the vehicle comprises a main rectangular frame 1 adapted at its forward end for draft connection with a tractor in any convenient manner, said frame including parallel side beams 2. Rearwardly of its center of length the frame is supported by wheels 3 disposed laterally out from the beds 2 and supported from brackets 4 on said beams and so that the center of the wheels is above the frame.

Disposed above the frame 1 is the vertically movable load carrying bed 5 of the vehicle having a frame which includes side beams 6 spaced apart the same as the beams 2 and adapted to rest and be supported thereon when the bed is fully lowered.

The main frame and bed frame are connected by longitudinally spaced pairs of transversely spaced links 7, three pairs of links being preferably used with a bed of average length. These links are disposed laterally inward of the beams 2 and 6. All but the rear pairs of links are connected at their lower end by cross shafts 8 supported in brackets 9 mounted on the beams 2, and at their upper end by cross shafts 10 supported in brackets 11 mounted on the beams 6. The shafts 8 are disposed on a level intermediate the top and bottom edges of the beams 2, while the shafts 10 are disposed on a level below the lower edge of the beams 6. By so doing the maximum lift for links of any given length is obtainable, and said links will be substantially horizontal when the bed is fully lowered and will have only a slight upward slope rearwardly from their lower to their upper end. The rearmost pair of links, though pivoted at corresponding points to the frames, are disconnected so as to leave the space therebetween clear, as is necessary to receive the operating mechanism which will now be described.

Pivoted on the rear cross member of the frame 1 centrally between the beams 2 is a forwardly projecting hydraulic cylinder 12 from the forward end of which a piston rod 13 projects. Rigidly secured on the forward end of this rod is a crosshead 14 having a pair of transversely spaced forwardly opening saddles 15 adapted to straddle similarly spaced rollers 16 turnably mounted on the upper shaft 10 of the intermediate pair of links 7. Each saddle is formed with a forwardly projecting straight lip 17 on its lower end. Also mounted on the crosshead below the saddles are transversely spaced rollers 18 positioned to ride on cams 19 disposed therebelow. These cams are of straight inclining form, sloping upwardly toward the front and mounted on a rigid plate or cross member 20 connecting the side beams 2 at their lower edge.

The cams are disposed relative to the position of said shaft 10 and rollers 16 when the bed is fully lowered so as to project rearwardly from said shaft with the high end almost directly under but spaced from said rollers. When the bed is in this position the piston rod is fully retracted and the rollers 18 ride on the cams adjacent their low end, with the saddles clear of the rollers 16 but with the lips 17 projecting under said rollers somewhat and practically engaging the same, as shown in Fig. 1.

When power is supplied to the rear end of the cylinder to advance the piston rod, the rollers 18 ride up on the cams, thus lifting the crosshead. At the same time the lips 17 advance under the rollers 16, engaging and lifting the same and thus initially swinging the links from their lowered substantially horizontal position. These lips also, as will be evident, serve to maintain the rollers 16 in guided relation with the saddles. By the time the saddles fully engage the rollers the links have been raised sufficiently to enable the further lift of the same to be effected directly from the piston rod by the longitudinal pressure thereof, without excessive power. The rollers 18 then of course leave the cams and the cross-head saddles remain in supporting engagement with the rollers 16 and move up about an arc with the links to fully raise the bed to the position shown in Fig. 2; the cylinder, piston rod and cross-head of course swinging as a unit about the rear pivot mounting of the cylinder as an axis.

Due to the use of the cam engaging rollers on the crosshead and to the lip and saddle engaging rollers on the link shaft, frictional resistance to the initial upward movement of the bed when the resistance to the lifting action is the greatest, is minimized.

The necessary fluid pressure is supplied to the cylinder to actuate the piston rod in a forward direction by a suitable conduit 21 leading forwardly from the cylinder along the main frame to the forward end of the latter for connection with and controlled from a hydraulic pressure unit on the tractor in any convenient manner.

The bed is lowered by gravity, and to aid in the initial lowering movement, if necessary, a flexible unit 22 including a tension spring 23 connects one link and the main frame. The spring and unit are normally slack and the spring is only placed under tension when the link and bed approach a fully raised position, so that the spring will not resist the main upward movement of the link.

While the cylinder 13 is mainly arranged for one-way operation under power, since the gravity lowering of the bed will of itself cause the piston rod to be retracted, it is necessary—and means is provided—to also feed fluid pressure to the forward end of the cylinder so that the crosshead may be retracted from the rollers 16 after the bed has been fully lowered.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention, what we claim as new and useful and desire to secure by Letters Patent is:

1. A load carrying vehicle comprising a main wheel mounted frame, a vertically movable load carrying bed above said frame and including a frame, longitudinally spaced pairs of links between the frame, said links being pivoted at their lower end on the main frame and at their upper end on the bed frame and being disposed in a substantially horizontal position when the bed frame is fully lowered, a cross member connecting one pair of links at their upper end, and having an element thereon, a power cylinder pivoted on the main frame and extending lengthwise thereof, a piston rod projecting from the cylinder toward the cross member from a direction opposite the lower end of said one pair of links, a cross head on the piston rod having a portion engageable with the element and means between the crosshead element and main frame to cause the initial advance of the piston rod to exert a direct upward pressure on the cross member before the element is engaged by said crosshead portion and the longitudinal pressure of the piston rod is exerted thereon.

2. A load carrying vehicle comprising a main wheel mounted frame, a vertically movable load carrying bed above said frame and including a frame, longitudinally spaced pairs of links between the frame, said links being pivoted at their lower end on the main frame and at their upper end on the bed frame and being disposed in a substantially horizontal position when the bed frame is fully lowered, a cross member connecting one pair of links at their upper end, and having an element thereon, a power cylinder pivoted on the main frame and extending lengthwise thereof, a piston rod projecting from the cylinder toward the cross member from a direction opposite the lower end of said one pair of links, said element being a roller, a crosshead on the outer end of the piston rod having a roller receiving saddle facing the roller and spaced therefrom when the bed is fully lowered and the piston rod is fully retracted and means between the crosshead, roller and main frame to cause the initial advance of the piston rod to exert a direct upward pressure on the roller before the saddle engages the roller, while maintaining the roller in line with the saddle for engagement thereby after a predetermined advance of the rod.

3. A load carrying vehicle comprising a main wheel mounted frame, a vertically movable load carrying bed above said frame and including a frame, longitudinally spaced pairs of links between the frame, said links being pivoted at their lower end on the main frame and at their upper end on the bed frame and being disposed in a substantially horizontal position when the bed frame is fully lowered, a cross member connecting one pair of links at their upper end, and having an element thereon, a power cylinder pivoted on the main frame and extending lengthwise thereof, a piston rod projecting from the cylinder toward the cross member from a direction opposite the lower end of said one pair of links, said element being a roller, a crosshead on the outer end of the piston rod having a roller receiving saddle facing the roller and spaced therefrom when the bed is fully lowered and the piston rod is fully retracted, a lip projecting forwardly from the saddle on which the roller initially rides whereby to guide the saddle into the roller upon advance of the piston rod from a fully retracted position, and means between the crosshead and main frame to cause the initial advancing movement of the piston rod and crosshead to lift the latter before the saddle engages the roller.

4. A structure as in claim 3 in which said last named means comprises a cam sloping upwardly away from the cylinder and fixed with the main frame below the crosshead, and a roller on the crosshead initially riding on the cam.

5. A load carrying vehicle comprising a main wheel mounted frame, a vertically movable load carrying bed above said frame and including a frame, longitudinally spaced pairs of links between the frame, said links being pivoted at their lower end on the main frame and at their upper end on the bed frame and being disposed in a substantially horizontal position when the bed frame is fully lowered, a cross member connecting one pair of links at their upper end, and having an element thereon, a power cylinder pivoted on the main frame and extending lengthwise thereof, a piston rod projecting from the cylinder toward the cross member from a direction opposite the lower end of said one pair of links, said element being a roller, a crosshead on the outer end of the piston rod having a roller receiving saddle facing the roller and spaced therefrom when the bed is fully lowered and the piston rod is fully retracted, means between the crosshead and main frame to cause said crosshead to lift a predetermined distance upon the initial advance of the piston rod and means formed with the crosshead and engaging the roller to lift the latter a corresponding amount while guiding said roller toward the saddle.

6. A load carrying vehicle comprising a main wheel mounted frame, a vertically movable load carrying bed above said frame and including a frame, longitudinally spaced pairs of links between the frames, said links being pivoted at their lower end on the main frame and at their upper end on the bed frame and being disposed in a substantially horizontal position when the bed frame is fully lowered, a cross member connecting one pair of links at their upper end, power means mounted on the main frame, and means between said power means and cross member to first exert a substantially direct upward pressure on said cross member until the latter has moved upwardly a predetermined distance and the links are disposed at an acute angle to the horizontal, and to then exert an upward pressure thereon longitudinally of the vehicle in a direction to swing the links upwardly; said power means including a vertically swingable power actuated rod extending lengthwise of the vehicle, an element on the rod adapted to engage and support said cross member, and a cam operative to raise said element said predetermined distance after initial engagement of said element with the cross member and upon continued movement of the rod.

LOWELL C. SWIM.
CLAUD H. WILLIAMS.